O. H. SMITH.
HANDLE GUARD.
APPLICATION FILED MAY 24, 1915.

1,196,602.

Patented Aug. 29, 1916.

Witness
C. J. Maddox

Inventor
O. H. Smith

By Victor J. Evans
Attorney

UNITED STATES PATENT OFFICE.

OMAR H. SMITH, OF CLEVELAND, OHIO.

HANDLE-GUARD.

1,196,602.	Specification of Letters Patent.	Patented Aug. 29, 1916.

Application filed May 24, 1915.  Serial No. 30,127.

*To all whom it may concern:*

Be it known that I, OMAR H. SMITH, a citizen of the United States, residing at Cleveland, in the county of Cuyahoga and State of Ohio, have invented new and useful Improvements in Handle-Guards, of which the following is a specification.

This invention relates to a guard or protector for the handle of culinary utensils.

The primary object of the invention is to provide a guard which when applied to the handle of a coffee-pot or similar vessel prevents the heating of the handle, while the pot or vessel is resting upon a stove.

A further object of the invention is to provide a guard of this character which may be stamped from suitable material, and to one which may be quickly applied or easily detached from the handle of a pot or vessel when desired.

The invention consists in the improved construction and novel arrangement and combination of parts which will be hereinafter fully described and particularly pointed out in the claim.

The preferred embodiment of the invention has been illustrated in the accompanying drawing, but no restriction is necessarily made to the precise structural details therein shown, as changes, modifications and alterations in the scope of the claim may be resorted to when so desired.

Figure 1:
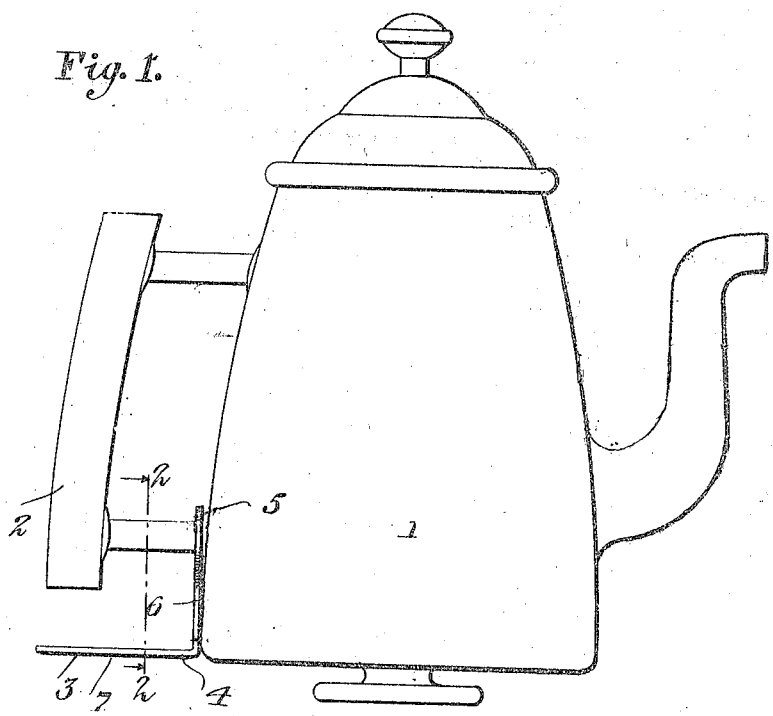
Figure 2:
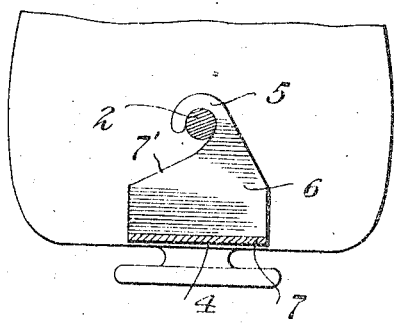
Figure 3:
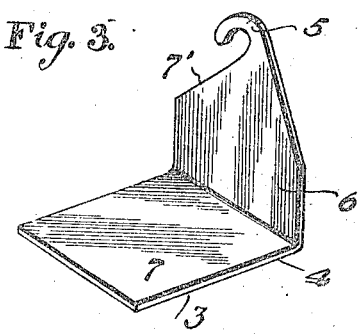

In the drawing: Figure 1 is a side elevation of a coffee-pot showing the improved handle guard applied to the handle thereon. Fig. 2 is a sectional view on the line 2—2 of Fig. 1. Fig. 3 is a detail perspective view of the improved handle guard.

Like characters of reference denote corresponding parts throughout the several views in the drawing.

The numeral 1 designates a coffee-pot or similar vessel and 2 the handle thereon, the pot 1 being of a familiar and well known type. The handle guard 3 is preferably stamped from any suitable heat resisting material and comprises a rectangularly shaped body portion 4 having one end thereon shaped to provide a hook 5, which may be used to attach the handle guard to the handle of the coffee-pot as shown in Fig. 1 of the drawing. The body 4 of the handle guard is bent at a point substantially intermediate its ends to form right angularly extending heat deflecting surfaces 6 and 7, the heat deflecting surface 6 terminating in the handle engaging hook 5, while the heat deflecting surface 7 is adapted to be disposed beneath the handle of the pot or vessel to which the handle guard is attached.

The heat deflecting surface 6 at one side thereof is beveled, as at 7' to form a shoulder which is adapted to assist in positioning the handle guard 3 upon the handle of a vessel. In practice when the pot or vessel 1 is to be disposed upon a stove, or over a burner opening therein the shoulder 7' is positioned against the handle on the pot or vessel and the hook end 5 of the guard 3 is drawn into engagement with the handle. It will be noted by reference to Fig. 1 of the drawing that when the hook 5 is engaged with the handle of the pot or vessel the heat deflecting surface 7 extends outwardly from the body of the vessel and beneath the handle thereon, so that the heat from the stove upon which the vessel is disposed is deflected from the handle of the vessel, thus permitting the handle on the vessel to be grasped without the assistance of a cloth when removing the pot from the stove.

From the foregoing description taken in connection with the accompanying drawing it will be apparent that a handle guard has been provided, which is inexpensive of manufacture, durable in use and of simple construction.

Having thus described the invention what is claimed is:—

The herein described guard for retaining the handle of a cooking vessel in a cool condition comprising a plate in the shape of a right-angle and having one of its sides centrally formed with a hook to engage with the handle, said guard being adapted to rest against the side of the vessel to maintain the other side of said plate directly below the handle and above the bottom surface of the vessel when arranged upon a stove or the like and to be readily removed from the cooking vessel.

In testimony whereof I affix my signature in presence of two witnesses.

OMAR H. SMITH.

Witnesses:
FRANK J. MCENNENY,
LOTTA MINER.